R. CANNAN.
COTTON HARVESTER.
APPLICATION FILED DEC. 9, 1913. RENEWED AUG. 3, 1917.
1,259,356. Patented Mar. 12, 1918.
5 SHEETS—SHEET 1.
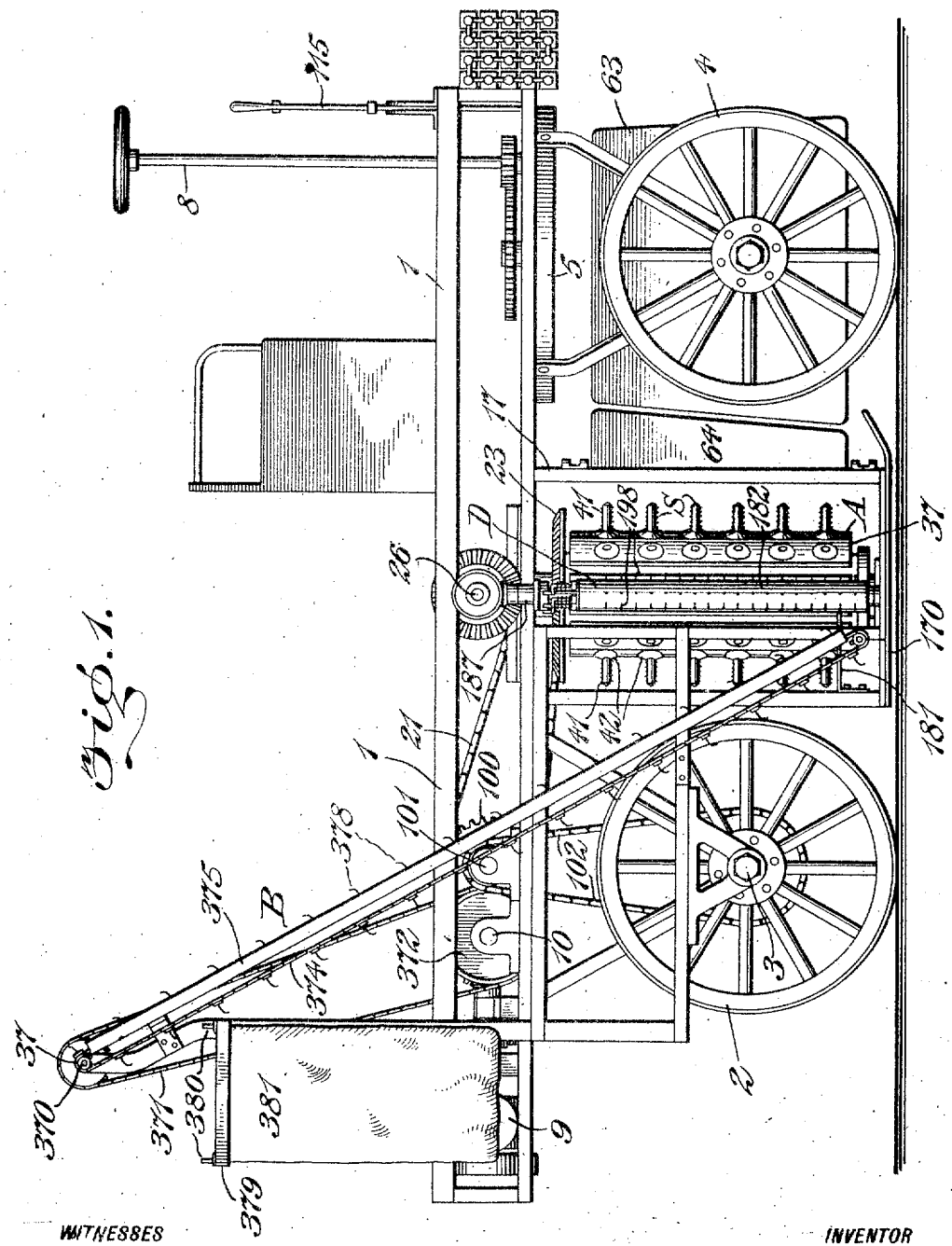
WITNESSES
INVENTOR
Robert Cannan
BY
ATTORNEY

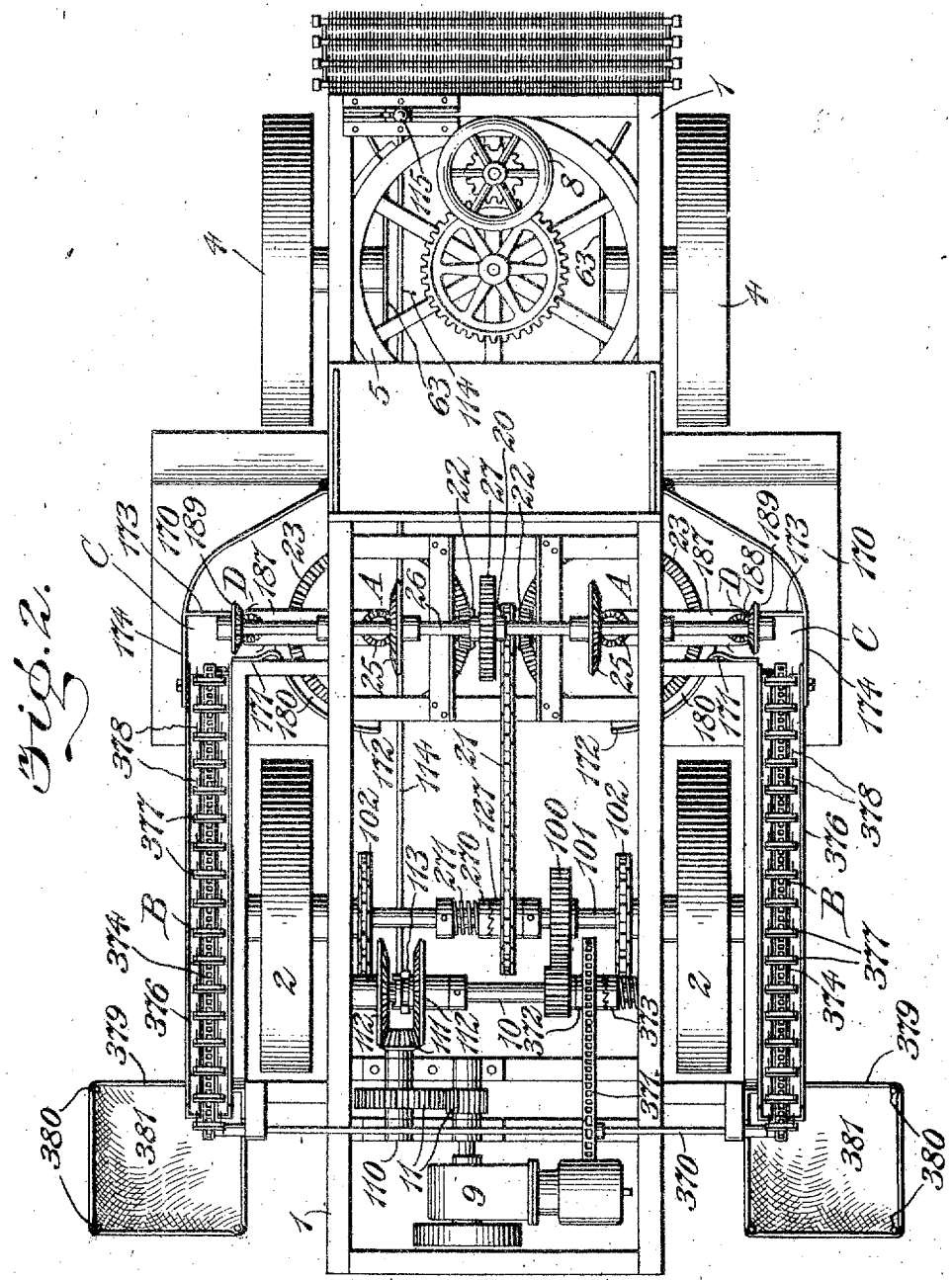

R. CANNAN.
COTTON HARVESTER.
APPLICATION FILED DEC. 9, 1913. RENEWED AUG. 3, 1917.

1,259,356.

Patented Mar. 12, 1918.
5 SHEETS—SHEET 3.

WITNESSES
A. C. Abbott
D. L. Rubinow

INVENTOR
Robert Cannan
BY
ATTORNEY

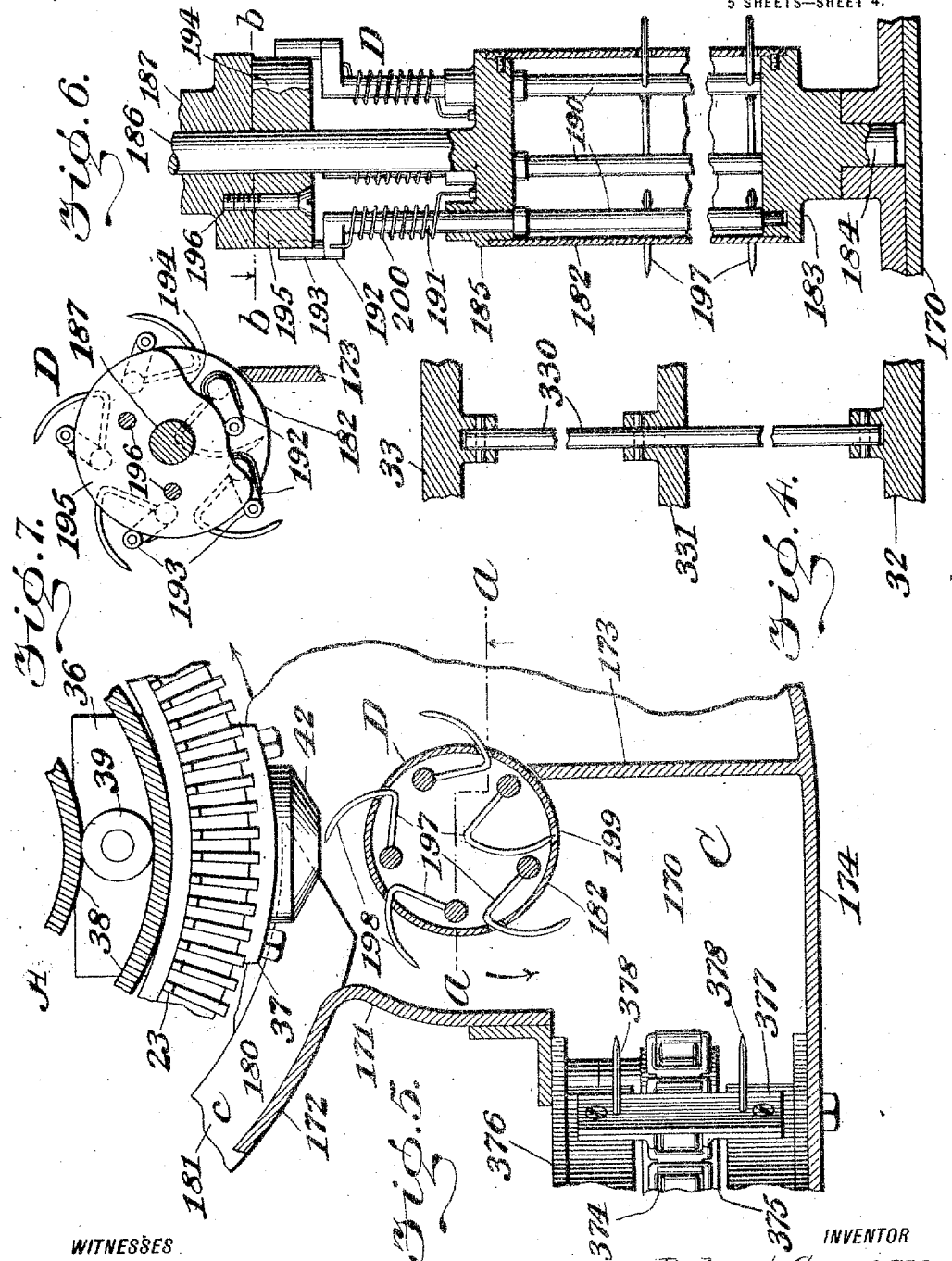

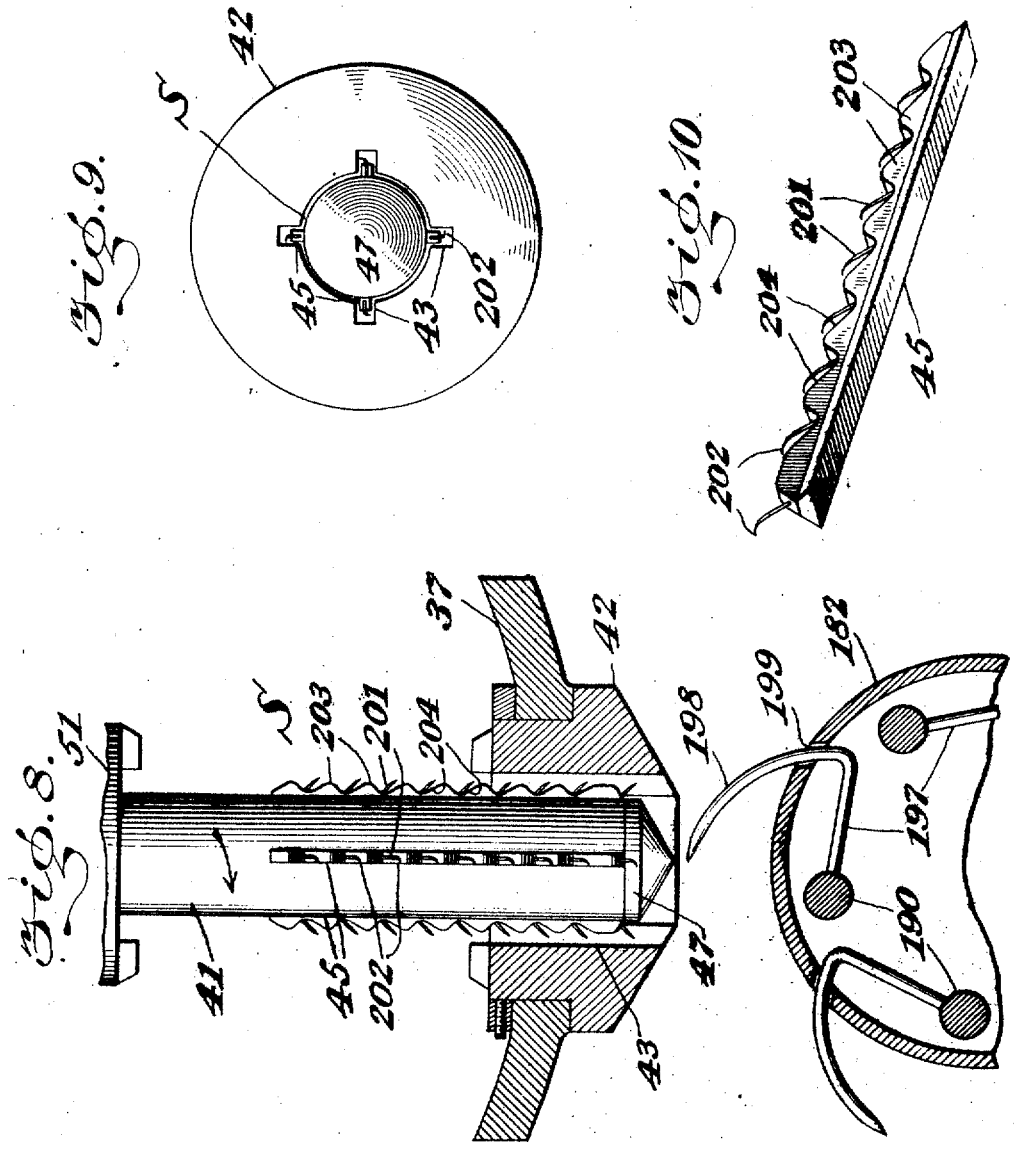

UNITED STATES PATENT OFFICE.

ROBERT CANNAN, OF BROOKLYN, NEW YORK.

COTTON-HARVESTER.

1,259,356. Specification of Letters Patent. Patented Mar. 12, 1918.

Application filed December 9, 1913, Serial No. 805,521. Renewed August 3, 1917. Serial No. 184,356.

*To all whom it may concern:*

Be it known that I, ROBERT CANNAN, a citizen of the United States, residing in the city of New York, borough of Brooklyn, county of Kings, and State of New York, have invented certain new and useful Improvements in Cotton-Harvesters, of which the following is a specification.

This invention relates to certain improvements in cotton-harvesters, and more particularly in that class or type of such devices which are provided with mechanically actuated picking means adapted to be drawn over the field for picking the cotton from the plants in a substantially automatic manner, and the object of the invention is to provide a harvester of this general character, of a simple and comparatively inexpensive nature and of a strong and compact construction, having certain features of novelty and improvement whereby the picking of the cotton is accomplished in a more substantially complete and effective manner, with lessened liability of derangement or clogging of the operative parts of the harvester, and without requiring the exercise of any special or peculiar skill or care on the part of the operator for assuring effective operation of the picking means during the practical use of the harvester.

The invention consists in certain novel features of the construction, and combinations and arrangements of the several parts of the improved cotton harvester whereby certain important advantages are attained, and the device is rendered simpler, less expensive, and otherwise better adapted and more convenient and effective for use, all as will be hereinafter fully set forth.

The novel features of the invention will be carefully defined in the claims.

In order that my improvements may be the better understood, I will now proceed to describe the invention with reference to the accompanying drawings wherein—

Figure 1 is a side elevation of a harvester provided with my improvements; the housings for certain of the operative parts being omitted for purposes of illustration;

Fig. 2 is a plan view of the harvester as shown in Fig. 1;

Fig. 3 is a fragmentary sectional view drawn to an enlarged scale and taken transversely through the picking means in order to illustrate certain features of novelty and improvement which will be hereinafter referred to;

Fig. 4 is a fragmentary view showing a feature of construction of one of the supports for the picking members which will be more fully described hereinafter;

Fig. 5 is an enlarged fragmentary sectional plan view taken through certain parts of the picking means at one side of the improved harvester;

Fig. 6 is an enlarged fragmentary sectional view taken vertically through the devices shown in Fig. 5 in the plane indicated by the line $a$ $a$ in said figure;

Fig. 7 is a sectional detail view taken in the plane indicated by line $b$ $b$ in Fig. 6 showing certain features of the cam device for controllably operating the transfer mechanism;

Fig. 8 is an enlarged fragmentary sectional plan view taken horizontally through the picking means at one side of the harvester illustrating the operation of the transfer mechanism;

Fig. 9 is a view showing, in end elevation, one of the picking members together with the related stripper member operable to direct the cotton to the transfer mechanism; and Fig. 10 is an enlarged perspective view showing one of the toothed or serrated strips employed upon the picking members in the embodiment of my invention herein shown.

In these views I have shown my invention applied for use in connection with a cotton harvester of the type shown and claimed in my prior United States Letters Patent, No. 723,985, granted March 31, 1903, but while my present improvements are especially well adapted for such use, and present important advantages when so applied, I do not desire to be understood as limiting myself to this special application of my invention, since it will be apparent that my improvements may be used in connection with other types or kinds of harvesters with good results.

As herein shown the harvester is constructed in the form of an auto-vehicle, the harvesting devices being supported upon a main vehicle frame 1 having rear driving wheels 2, secured upon the ends of a rotatable rear axle 3, and provided with front or steering wheels 4 independently rotatable upon the ends or sides of a yoke pendent below a fifth wheel 5 which is rotatable upon the main frame by means of gearing from a steering head 8, so as to be adapted to turn the front wheels in a well known way for steering the vehicle.

As herein shown, the vehicle is driven by a motor 9 of any approved type mounted upon the main frame 1, in driving relation to a counter shaft 10 through reversible gearing in such a manner that the direction of movement of the counter shaft may be reversed at the will of the operator. As herein shown this gearing includes intermeshing gear wheels 11, operable to drive a short shaft 110 carrying a miter pinion 111 meshing at opposite sides with miter gears 112, 112 spaced from each other and freely rotatable upon the counter shaft 10. 113 represents a clutch member slidable upon a feather upon shaft 10 between the reversely driven miter gears 112, 112 and adapted to be disengaged from said gears 112 when centrally positioned and when moved in one direction or the other along shaft 10, to be engaged with one or the other of said gear wheels 112, 112 according to the direction in which it is desired to drive the vehicle. 114 represents a rock-shaft extended lengthwise of the main frame 1, its rear end having a forked arm operatively engaged with the clutch member 113 to slide the same along shaft 10 into engagement with one or the other of the miter gears 112, 112 accordingly as the rock-shaft is turned in one direction or the other; and the forward end of said rock shaft carries an arm or lever 115 adjacent to the steering means, so that the operator may conveniently rock the shaft 114 from the driver's seat for controlling the direction of travel of the vehicle, or stopping the same.

101 represents a cross shaft rotatable upon the main frame 1 above the rear axle 3 and slightly in advance of the counter shaft 10, from which it is driven by means of gearing 100, and 102 represents chain drives at the opposite ends of this cross shaft for communicating the movement of the same to the rear axle 3 for driving the vehicle over the field or along the road.

So far as described, the structure is substantially similar to that set forth in my prior patent, and is herein shown merely for convenience in illustrating one practical and advantageous application of my present invention.

As in my prior patent, the front and rear wheels of the vehicle are spaced from each other at distances sufficient to enable them to travel at opposite sides of the rows of plants during the use of the harvester in the field, and the picking means are located between the front and rear wheels, and are duplicated at opposite sides of the main frame 1, as indicated at A, A in Figs. 1 and 3 of the drawings, so as to be adapted for operation simultaneously upon the opposite sides of the plants as the same pass between the duplicate picking means during the travel of the harvester over the field. The forward part of the machine is also provided with spaced gathering devices 63 and 64 between which the plants are received and which operate to direct said plants into effective relation to the duplicate picking means, A, A.

As in my prior patent hereinbefore referred to, the duplicate picking means A, A are constructed in the form of drums spaced from each other and bearing peripheral picking stems or members engageable with the cotton to pick the same from the plants, and these drums are reversely driven by means of suitable gearing from a transversely extended shaft 26 which is in turn driven by means of a chain drive 21 from a sprocket wheel loosely mounted upon the cross shaft 101. This sprocket wheel has its boss 127 provided with a ratchet-like clutch surface engageable with a similar clutch surface upon a collar 270 slidable upon said shaft 101 and normally pressed by a spring 271 into engagement with the sprocket wheel so as to be operable to transmit movement from the motor to the transverse shaft 21 for driving the picking means from the motor during forward travel of the machine over the field, but when the travel of the machine is reversed, the clutch surfaces slip freely over one another without driving the picking means. An appropriate lever mechanism for moving and holding the collar 270 out of engagement with the sprocket wheel, or equivalent means may also be provided, affording a detachable driving connection which may be operated to disconnect the motor from the picking means when the latter are out of use as, for example, when the harvester is being driven along the road under its own power.

As in my hereinbefore recited prior patent, the harvester as herein shown is also provided with duplicate elevating or conveying means, indicated as a whole at B, B upon the drawings which are adapted, respectively, to receive the cotton removed from the plants by the corresponding or related picking means, and to carry the same upwardly to a suitable receptacle. These conveying or elevating means, as herein shown, are in the nature of endless chain conveyers inclined upwardly and rearwardly and driven by sprocket wheels 37 at their upper parts. The sprocket wheels 37 are upon the ends of an elevated transverse shaft 370, driven by a chain drive 371 from a sprocket wheel 372 loosely mounted upon the counter shaft 10 and provided with a ratchet-like clutch surface upon its boss engageable with a spring pressed collar 373 keyed or otherwise held for sliding movement upon said shaft 10 so as to be operable similarly to the collar 270 heretofore described for preventing reversed operation of the conveying means when the travel of the vehicle is reversed in the field. The same means above referred to for disconnecting the picking devices when not in use from the motor drive, may evidently be employed for withdrawing and holding the collar 373 out of engagement with the sprocket wheel 372 when the picking and conveying means are not required to operate.

As shown herein the forward or upper side or rim of the conveyer chain 374 is operable to carry the cotton received from the picking means upwardly and rearwardly and is guided and supported by an elongated guide strip or member 375. A housing, which has been omitted in the drawings except in Figs. 2 and 5, where a part of same is indicated at 376, will ordinarily be provided for inclosing the conveyer chain and preventing the cotton from dropping therefrom. In the structure shown the endless chain 374 is provided at intervals with transversely extended cleats or plates 377 secured by means of screws or the like to certain of the chain links and bearing spaced slender pins or fingers 378, projecting outwardly therefrom and having sharp pointed extremities adapted for secure engagement in the cotton fiber at the lower part of the conveyer so as to be operable to penetrate the same sufficiently to carry the cotton upwardly to the top of the machine where at the commencement of the descent of said pins or fingers the cotton is permitted to drop freely therefrom.

The pointed extremities of the pins or fingers 378 are curved or hooked in such a manner as to be directed upwardly while traveling upward along the guide strip or member 375, the better to engage and support the cotton, and at opposite sides of the upper part of the machine elevated yokes 379 are provided, having internal hooks or pins 380 or equivalent devices for detachable engagement with the open mouths of bags 381 which are thereby held in opened position immediately beneath the upper delivery ends of the respective conveying means, in position to receive the cotton as the same is dropped from the chains.

While I have found this type of conveying means of advantage in a harvester of the class to which I have herein shown my improvements applied, it will be understood that the same is in no way essential to the present invention and may be omitted or replaced by other means without departure from my invention.

C, C represent chambers or compartments which are provided adjacent to the outer sides of the respective picking means A, A, being provided with floors or bottoms 170 formed from their material and extended horizontally outward from the lower parts of the pendent yokes or frames 17 wherein the picking drums are journaled, so as to receive any cotton which may drop from the picking members, and prevent the same from falling to the ground. The compartments or chambers C, C also have imperforate rear walls 171 extended upwardly from their bottoms 170 and directed inwardly from the lower part of the housing 376 for the conveying means, the forward lower ends of which have communication with the lower parts of said chambers or compartments C, C, so as to receive the cotton therefrom.

The inner parts of the rear walls 171 of the chambers or compartments C, C, are herein shown provided with extensions 172, curved conformably to the peripheral surfaces of the picking drums so as to afford shields extended over the rear sides of the drums to prevent the cotton from dropping from the picking members, and to assure delivery thereof into the chambers or compartments C, C.

The forward and outer parts of the chambers or compartments C, C are also shown provided with closed walls, as indicated at 173 and 174, and I have found it of advantage to mount the outer walls 174 upon hinges so that they may be thrown open to afford convenient access to the interiors of said chambers or compartments when desired.

As in my prior patent the picking drums are provided with annular gear members or rings or racks 23 at their upper parts, intermeshing with miter pinions 22 upon the opposite ends of the cross shaft 21 for imparting movement to the drums, and where this and similar constructions are employed I have found it of material advantage to so proportion the gearing that the rearward travel of the picking stems or members S shall substantially equal the forward travel of the harvester over the field in order to avoid breakage of the plants or loss of power due to the necessity of dragging the picking stems through the plants.

As in my prior patent I have also shown the picking drums provided with upper and lower heads or members 33 and 32, and I have found it of advantage, where this construction is adopted, to produce the drum wall in the form of a series of parallel independently removable stave-like sections or members 34, 34 each of which supports several of the picking stems or members S, S, and I have also found it advantageous for facilitating the removal of the staves and other parts and for bracing and strengthening the structure, to provide rigid connections 330, 330 between the upper and lower heads or members 33 and 32, which may remain permanently in position during repair or adjustment of the operative parts, and avoid the liability of derangement or loosening of the parts which might otherwise occur. I have found it desirable to provide say four of said rigid connections in the form of rods or braces extended endwise within the drums, pinned or bolted at their upper and lower ends within equidistant sockets produced in the upper and lower heads 33 and 32 and to tie these rigid connections 330 together at the central parts of the drums by means of annular brace members 331 as clearly shown in Figs. 3 and 4.

As in my prior patent hereinabove referred to I have shown the drums provided with vertical shafts 24 extended axially through them and provided at their upper ends with driving means which in the structure herein shown comprises bevel gears 25 whereby movement is communicated from a transverse shaft 26 journaled upon the main frame above the shaft 21 and driven therefrom by toothed gearing 27. 30 represents bevel gearing within the respective drums of the picking means at A, A, whereby movement is communicated from the axial shafts 24 to drive the journals 40 of the picking stems or members S, S, said journals being supported in bearings upon the several stave-like sections or members 34 of the drum wall so that they may be readily removed from the drum while held in relation by the members or sections of the drum wall to permit repairs to be conveniently effected.

The upper and lower heads or members of the picking drums are also provided with outwardly directed guide ways 35, 35 in which are held radially movable slide members 36, 36 at the upper and lower ends of outer stave-like actuating members 37 which are directed vertically outside the drum wall formed by the stave-like sections or members 34, 34 which support the spindles or journals 40 of the picking stems or members S, and 42, 42 represent stripper members of rounded or disk-like form which are collared and supported for free rotatory movement in said actuating members 37 in position for coöperation with the stems or members S and other parts of the mechanism, as will be hereinafter explained. 38, 38 represent fixed cams at the upper and lower parts of the drums having cam grooves wherein are engaged rollers 39 or the like upon the slide members 36, 36 of the several actuating members or staves 37, whereby it will be seen that radial movement is imparted to said members during the rotation of the drums to cause the stripper members 42 collared in said actuating members to travel lengthwise along the picking stems or members S for purposes to be hereinafter explained.

As in my before mentioned prior patent, the picking stems or members S have sleevelike body portions 41, which are supported loosely mounted upon the journals or spindles 40 so that the latter may turn freely within said body portions without rotating the latter, and 51 represent spring pressed clutch members held upon the spindles or journals 40 adjacent to and adapted, when the actuating members 37 are forced or drawn inwardly adjacent to the walls of the drums, to engage clutch surfaces at the inner parts of the stripper members 42 in such a manner as to lock said members 42 securely to the spindles 40 in order that the parts may rotate together. Since the clutch members 51 are or may be similar in structure and operation to corresponding clutch members shown in my said prior patent, I have not deemed it necessary to illustrate them in detail herein. When the actuating members are moved outwardly from the drum walls, the clutch devices are obviously disengaged, and the stripper members no longer rotate in their bearings in the actuating members 37.

45, 45 represent a plurality of toothed or serrated strips which are directed endwise along the body portion of each of the respective picking stems or members S, being herein shown formed separately from said body portions and held in dovetail or undercut guideways therein. Each body portion 41 is also herein shown provided with a removable cap at its outer end which serves to hold the several toothed or serrated strips 45 in position in the guide ways. The strips 45 as herein shown project slightly beyond the peripheral surfaces of the body portions 41 whereon they are mounted and afford feathers or guides directed lengthwise along the stems or members S, slidingly engaged in slots or kerfs 43 in the corresponding stripper members and operable to compel rotation of the sleeve-like body portions 41 in unison with the stripper members 42 when the latter are forced inwardly into engagement with the clutch members 51 by the action of the cams 38, while permitting free movement of said stripper members endwise along the stems or members S in unison with the radial movement of the actuating members.

As in my prior patent, the cams 38 are so proportioned and arranged that the actuating members 37 are drawn inwardly toward the wall of the drum so as to cause the toothed or serrated picking stems or members S to project outside of said members 37 when the stems or members S are at the inner parts of the drums in position to penetrate the plants and pick the cotton, and in this position of the members 37 the stripper members 42 are engaged with the clutch members 51 so as to be driven therefrom in order that rapid rotation may be imparted to the stems or members S for drawing the fiber from the balls and winding it around the stems, and the structure and arrangement of the curved extensions 172, 172 of the rear walls of the chambers or compartments C, C are such that the extremities of the picking stems or members S, S, after their withdrawal from the plants, come into position opposite to said extensions before the action of the cams 38 in forcing the actuating members 37 and stripper members 42 outward along the stems or members S shall have progressed to such an extent as might render the picked cotton liable to fall or drop from the stems to the ground, whereby it will be seen that during the introduction of the cotton within the chambers or compartments C, C, the extensions operate to retain the fiber in place upon the picking stems without in any way interfering with the action of the stripper members in forcing the fiber outward toward and upon the outermost ends of the stems or members S.

In this way it will be seen that the structure is such that the extensions 172 as indicated in Fig. 2 extend around the rear parts of the drums to such a distance that the extremities of the picking stems or members S are engaged within said extensions before the stripper members have operated to any such extent as would render the cotton liable to drop from the stems and during the action of the stripper members said extensions being closely adjacent to the points of the stems S afford stops or guides which prevent the cotton from dropping off the stems and assure its delivery within the compartments or chambers C without likelihood of the fiber catching upon the rear walls of said chambers or compartments such as would be liable to occur were the extensions 172 or some equivalent means not provided for directing the cotton past said rear walls.

The arrangement of the drums and extensions 172 is also such as to afford a passage around the rear part of each drum affording an inlet for the cotton into the corresponding chamber or compartment C as clearly indicated at 180 on the drawings and 181 represents a bottom extended around each of these passages and extended inwardly from the corresponding curved extension 172 in shelf-like formation so as to be adapted to receive any fiber which may drop from the stems or members S in order to prevent the same from falling to the ground. These bottoms or shelf-like portions 181 at the respective passages 180 are positioned below and closely adjacent to the lowermost picking stems or members S at the respective drums as clearly indicated in Fig. 1 so that in the operation of the machine said lowermost stems or members S will operate to sweep the fiber resting upon said bottoms or shelf-like portions into the chambers or compartments C and thereby prevent clogging of the operative parts. I have discovered that a tendency very often exists for the cotton fiber to adhere to the stems or stripping members even when the latter have finished their operation whereby the rotation of the drum tends to carry the fiber forwardly out of the chambers or compartments instead of delivering the same into said chambers or compartments or to some equivalent receiving means and according to my present invention I provide in connection with each set of picking means comprised in the harvester a transfer mechanism indicated at D upon the drawings operable to assure the removal of the fiber from the picking means so as to prevent the same from being lost or clogging the mechanism by adhering thereto.

As herein shown each transfer mechanism comprises a vertically extended drum or cylinder 182 positioned in the corresponding chamber or compartment C closely adjacent to the path traversed by the extremities of the stems or members S during the rotation of the corresponding picking drum said cylinders having lower ends 183 provided with step bearings as indicated at 184 at the bottoms of the chambers or compartments C and being provided at their upper ends with heads 185 having axially extended studs or stems 186 directed upward through bearings 187 extended across the tops of the chambers or compartments and provided at their upper ends with beveled gear wheels 188 meshing with corresponding beveled gear wheels 189 upon the extremities of the shaft 26 from which the picking drums are driven as hereinbefore described, whereby it will be seen that the drums or cylinders 182 are continuously driven during the operation of the harvester.

Each drum or cylinder 182 is tubular and within it are arranged a plurality of equidistant rock-shafts 190, 190 herein shown as five in number, extended parallel with the axis of the drum or cylinder and supported in bearings at the upper and lower ends or heads thereof as clearly indicated in Fig. 6 of the drawings, the upper extremities of said rock-shafts being directed above the upper head or end 185 of the drum or cylinder as shown at 191 in the drawings and being provided with crank arms 192 having antifriction rollers 193 adapted to traverse and roll around the peripheral cam surface 194 of a cam block or member 195 held at the underside of the corresponding bearing 187 by means of screws or the like as shown at 196 in Figs. 6 and 7.

197, 197 represent a series of fingers extended from the respective rock-shafts within each drum or cylinder 182 having shank portions which are directed outwardly from the shafts parallel with each other and provided with hook-like end portions 198 which are curved concentrically with respect to the rock-shafts and are adapted when the shafts are moved to traverse apertures 199 in the walls of the drums or cylinders and have pointed extremities adapted to penetrate the cotton fiber so as to securely engage and hold the same.

As herein shown the stems or members S are positioned upon the picking drums in sets or series each comprising a plurality of stems extended vertically along the drum parallel with its axis and the parts are so constructed and arranged that as each set or series of stems or members S come into line with the corresponding transfer mechanism D and are most closely adjacent to the peripheral surface of the drum or cylinder 182 thereof the pointed hook-like extremities of one of the vertically extended sets or series of pins or fingers 197 at said drum or cylinder come into position to engage the cotton fiber stripped from said stems or members S by the corresponding strips and operate by engagement with the cotton to transfer the same positively from the picking drum to the drum or cylinder of the corresponding transfer mechanism.

The gearing by means of which the picking drums and cylinders 182 of the transfer mechanisms are driven are so arranged that the drums or cylinders of the transfer mechanisms are caused to turn oppositely to the rotation of the corresponding picking drums and the cam devices at the upper ends of the drums or cylinders of the transfer mechanisms are constructed in such a way as to operate through the crank arms of the rock-shafts 190 to protrude the hooked extremities of the pins 197 beyond the peripheries of the cylinders 182 prior to their engagement with the cotton and as herein shown the pins or fingers 197 are also so positioned along the shafts that the hooked extremity of one of the pins or fingers is alined with the extremity of each stem or member S during the transfer operation so as to approach the same as closely as possible to insure positive transfer of the fiber in case the same should adhere to the picking drum.

200, 200 represent springs coiled upon the upper extended ends of the rock-shafts 190 above the drum or cylinder of each transfer mechanism and operable by their tension to hold the rock-shafts normally turned in a direction which will retract the hooked extremities of the pins or fingers 197 to the greatest extent permitted by the corresponding cam device whereby it will be seen that said pins or fingers are caused by said cam device to protrude from the drum or cylinder in position to engage the fiber during the travel of the pins adjacent to the corresponding picking drum.

The front wall of each chamber or compartment C, as herein shown, has its inner edge portion closely adjacent to the peripheral surface of the corresponding drum or cylinder 182, so as to prevent the fiber from being drawn forwardly out of the chamber or compartment by the rotation of said drum or cylinder and the cam device at the upper end of the cylinder has its peripheral cam surface 194 so formed, as indicated in Fig. 7 of the drawings, as to permit the springs 200 to operate upon the several rock shafts 190 in such a way as to retract the hooked extremities of the pins or fingers 197 within the body of the drum or cylinder 182 as they approach said front wall of the chamber or compartment C, as clearly represented in Figs. 5 and 7, so that the pointed extremities of said pins or fingers are withdrawn from their engagement with the fiber, and are completely housed within the drum or cylinder, whereby the cotton is permitted to drop within the chamber or compartment, and the pins are prevented from interfering with the rotation of the drum or cylinder by engagement with said front wall, or from dragging the fiber out of the chamber or compartment.

By this construction and arrangement of the parts, the cotton taken from the plants by the picking means is conveyed to the corresponding chambers or compartments C, or equivalent receiving means substantially without liability of being dropped to the ground, and when in position at said chambers or compartments is prevented from being withdrawn by adherence to the continuously rotating picking drums. In the structure shown, the drum or cylinder 182 at each side of the machine is also positioned between the corresponding picking drum and the related conveying or elevating means, so as to operate to feed or transfer the fiber received from the picking means toward the conveying or elevating means, and in position to be engaged by the hook-like pins or fingers 378 thereof.

Where rotatable picking stems or members are employed, as in the structure herein set forth, I have also found it to be of advantage to provide such stems or members, whatever be their special construction, with comparatively slender pointed pins 201, 201, as indicated in Figs. 8, 9 and 10 of the drawings, engageable in the fiber and having their outer pointed extremities curved or inclined outwardly in the direction of length of said stems or members, and also in the direction of rotation thereof, whereby it will be seen that said pointed extremities of the pins are the better adapted to penetrate the fiber and secure an effective hold thereon such as is desirable for assuring substantially complete withdrawal of the fiber from the bolls, while at the same time such outward inclination or curvature of the pins toward the free outer ends of the stems or members S effectively guards against any tendency of the pins to interfere with the withdrawal of the fiber from the stems or members S, during the operation of the strippers and assures free slipping of the fiber outwardly along said stems or members when said strippers are operated for the withdrawal of the fiber from the picking devices.

I have also shown the strips or bars 45, whereof the pins 201 are carried, provided with rounded outwardly directed guard fingers or projections 203, intervening between said pins and affording between them recesses or spaces wherein the pins are positioned, said guard fingers or projections being operable to protect the pins against being bent or broken by engagement with the stems or the plants, etc., and from collecting leaves or other foreign substances such as would require to be separated from the collected cotton. As shown in Figs. 8, 9 and 10, said guard fingers or projections are of such extent and thickness as to shield the pins 201 as much as possible from the heavier portions of the plants, without interfering with the desired engagement of the pins with the fiber, and the inner parts of said projections or fingers 203 have inclined outer surfaces 204, over which the fiber is adapted to slip very readily during the operation of the strippers.

From the above description of my improvements, it will be apparent that the cotton harvester constructed in accordance with my invention is of an extremely simple and comparatively inexpensive nature, and is particularly well adapted for use by reason of the efficiency with which the cotton is removed from the plants and separated from the picking devices without liability of injury to the fiber, and it will also be obvious from the above description that the mechanism is susceptible of considerable modification without material departure from the principles and spirit of the invention, and for this reason I do not desire to be understood as limiting myself to the precise formation and arrangement of the several parts herein set forth in carrying out my invention in practice.

Having thus described my invention, what I claim and desire to secure by Letters Patent is—

1. A cotton harvester having picking members engageable with the plants to pick the cotton therefrom, means operable first, to move said members into position for engagement with the plants and afterward, to withdraw said members out of position for such engagement, mechanism adjacent to the path of said picking members when withdrawn from position for engagement with the plants, including a support having members operable, when projected, to engage and separate the cotton from the picking members, and adapted to be retracted to release the separated cotton and means for actuating said separating members operable first, to project the same in position to engage and separate the collected cotton from the picking members and afterward, to retract said separating members to release the separated cotton.

2. A cotton harvester having picking members engageable with the plants to pick the cotton therefrom, means operable first, to move said members into position for engagement with the plants and afterward, to withdraw said members out of position for such engagement, mechanism adjacent to the path of said members when withdrawn from position for engagement with the plants including a support having members provided with pointed extremities extended oppositely to the direction of movement of the picking members operable when projected, to engage and separate the cotton from the picking members and adapted to be retracted to release the separated cotton, and means for actuating said separating members operable first to project the same in position to engage and separate the collected cotton from the picking members and afterward to retract said separating members to release the separated cotton.

3. A cotton harvester having picking members engageable with the plants to pick the cotton therefrom, means operable first, to move said members into position for engagement with the plants and afterward, to withdraw said members out of position for such engagement, a receptacle adapted to receive the cotton picked by said members, mechanism adjacent to the path of said members when withdrawn from position for engagement with the plants including a support having members operable when projected, to engage and separate the cotton from the picking members, and adapted to be retracted to deliver the separated cotton to said receptacle, and means for actuating the separating members operable first, to project the same in position to engage and separate the collected cotton from the picking members and afterward, to retract said separating members to deliver the separated cotton to said receptacle.

4. A cotton harvester having rotatable picking members engageable with plants and provided with pins to engage and pick the cotton, means operable first, to move said members into position for engagement with the plants and afterward, to withdraw said members out of position for such engagement, means for terminating the rotatory movement of said members when withdrawn from position for engagement with the cotton, mechanism adjacent to the path of said members when withdrawn from position for engagement with the plants including a support having members provided with pointed extremities extended oppositely to the direction of movement of the picking members operable when projected, to engage and separate the cotton from the picking members and adapted when retracted, to release the separated cotton and means for actuating said separating members, operable first to project the same in position to engage and separate the collected cotton from the picking members and afterward, to retract said separating members to deliver the separated cotton to said receptacle.

5. A cotton harvester having a picking member supported at one end and having its opposite end projecting for engagement with the plants to pick the cotton therefrom, and movable to withdraw it out of position for such engagement, a receptacle to receive the picked cotton, means operable to strip the collected cotton outwardly toward the projecting end of the picking member during the withdrawal of said member out of position for engagement with the plants, and a wall extended from said receptacle along the path traversed by the picking member when withdrawn from position for engagement with the plants, and positioned outside of the projecting end of said picking member and adapted to prevent loss of the cotton from the picking member during operation of the stripping means prior to the arrival of said picking member at the receptacle.

6. A cotton harvester having a picking member supported at one end and having its opposite end projecting for engagement with the plants to pick the cotton therefrom, and movable to withdraw it from position for engagement with the plants, means adapted to receive the cotton from the picking member when the same is withdrawn from position for engagement with the plants, means operable to strip the collected cotton outwardly toward the projecting end of said picking member during the withdrawal of said member out of position or engagement with the plants, and a wall extended from said receiving means along the path traversed by the picking member when withdrawn from position for engagement with the plants, and positioned outside of the projecting end of the picking member, and adapted to prevent loss of the cotton from the picking member during the operation of the stripping means prior to the arrival of said picking member at the receiving means.

7. A cotton harvester having a picking member supported at one end and having its opposite end projecting for engagement with the plants to pick the cotton therefrom, and movable to withdraw it from position for engagement with the plants, transfer mechanism adjacent to the path of said members when withdrawn from position for engagement with the plants including a member adapted to engage and separate the collected cotton from said picking members, means operable to strip the collected cotton outwardly toward the projecting end of said picking member during the withdrawal of said member out of position for engagement with the plants, and a wall extended from said separating mechanism along the path traversed by the picking member when withdrawn from position for engagement with the plants and positioned outside of the projecting end of the picking member, and adapted to prevent loss of the cotton from the picking member during the operation of the stripping means prior to the arrival of said picking member at the separating mechanism.

8. A cotton harvester having a rotatably mounted support, picking members carried by the support adapted during the rotation thereof to be engaged with the plants to pick the cotton therefrom and afterward to be withdrawn from position for engagement with the plants, and mechanism adjacent to the path of the picking members when withdrawn from position for engagement with the plants including a support having pins in timed relation to the picking members and adapted to be presented successively to the respective picking members to separate the cotton therefrom.

9. A cotton harvester having a rotatably mounted support, picking members carried by the support adapted during the rotation thereof to be engaged with the plants to pick the cotton therefrom and afterward to be withdrawn from position for engagement with the plants, and mechanism adjacent to the path of the picking members when withdrawn from position for engagement with the plants including a support having timedly actuated members adapted to be successively projected in position to engage and separate the cotton from the picking members and capable of retraction to release the separated cotton and means for actuating the separating members operable first, to project the same in position to engage and separate the collected cotton from the picking members and afterward, to retract said separating members to release the separated cotton.

10. A cotton harvester having a rotatably mounted support, picking members carried by the support adapted during the rotation thereof to be engaged with the plants to pick the cotton therefrom and afterward to be withdrawn from position for engagement with the plants, and mechanism adjacent to the path of the picking members when withdrawn from position for engagement with the plants including a support having timedly actuated members adapted to be successively projected in position to engage and separate the cotton from the picking members and capable of retraction to release the separated cotton, means operable to move the collected cotton outwardly along the picking members toward the projecting ends thereof when said members are withdrawn from position for engagement with the plants and means for actuating the separating members operable first, to project the same in position to engage and separate the collected cotton from the picking members and afterward, to retract said separating members to release the separated cotton.

11. A cotton harvester having picking members engageable with the plants to pick the cotton therefrom, means operable first, to move said members into position for engagement with the plants and afterward, to withdraw said members out of position for such engagement, conveying means adapted to receive the cotton when picked and mechanism adjacent to the path of the picking members when withdrawn from position for engagement with the plants including a support having members operable when projected to engage and separate the cotton from the picking members and adapted to be retracted to release the separated cotton and means for actuating the separating members operable first, to project the same in position to engage and separate the collected cotton from the picking members and afterward, to retract said separating members to deliver the separated cotton to the conveying means.

12. A cotton harvester having a picking member supported at one end and having its opposite end projecting for engagement with the plants to pick the cotton therefrom, and movable to withdraw it from position for engagement with the plants, transfer mechanism adjacent to the path of said members when withdrawn from position for engagement with the plants including a member adapted to engage and separate the collected cotton from said picking members, a wall extended from said separating mechanism along the path traversed by the picking member when withdrawn from position for engagement with the plants and positioned outside of the projecting end of the picking member and adapted to prevent the cotton from being forced outwardly off the extremity of the picking member during the operation of the stripping means prior to the arrival of said picking member at the separating mechanism, and a shelf-like part inwardly directed from the lower part of said shield beneath the picking members along which the cotton dropping from said members is adapted to travel to the transfer mechanism.

13. A cotton harvester having a rotatably mounted support, picking members carried by the support adapted during the rotation thereof to be engaged with the plants to pick the cotton therefrom and afterward to be withdrawn from position for engagement with the plants, mechanism adjacent to the path of the picking members when withdrawn from position for engagement with the plants including a hollow rotatable drum-like support having an apertured wall, shafts extended longitudinally within the drum-like support and provided with pins in timed relation to the picking members and having curved pointed extremities extended in the direction of rotation of said drum-like support and adapted to be presented successively to the respective picking members to separate the cotton therefrom, and means for moving said shafts operable to protrude the pins from the wall of said drum-like support when in position to separate the cotton therefrom and afterward to retract said pins within the drum-like support to displace the separated cotton therefrom.

14. A cotton harvester having a rotatable drum-like support including members spaced at intervals along its axis of rotation, parts extended between said spaced members but outside the axis of rotation and affording permanent connection between said members, a plurality of bearing members detachably mounted upon said spaced members, and affording an outer drum wall, a shaft extended axially within said drum-like support and around which the latter turns, means for driving said drum-like support, picking members rotatably mounted upon the bearing members, and means within the drum-like support for driving said picking members from said axially arranged shaft during the rotation of the support around the shaft.

In witness whereof I have hereunto signed my name, in the presence of two subscribing witnesses.

ROBERT CANNAN.

Witnesses:
J. D. CAPLINGER,
THEO. H. FRIEND.